April 2, 1963     A. J. ZIOLKOWSKI ET AL     3,083,611
MULTI-LOBAR SCAN HORIZON SENSOR Filed Jan. 30, 1961     3 Sheets-Sheet 1

*INVENTORS*
ADRIAN J. ZIOLKOWSKI
ROBERT W. ASTHEIMER
GERALD FALBEL
RICHARD F. LEFTWICH

BY

*ATTORNEY*

April 2, 1963 A. J. ZIOLKOWSKI ET AL 3,083,611
MULTI-LOBAR SCAN HORIZON SENSOR
Filed Jan. 30, 1961 3 Sheets-Sheet 2

INVENTORS
ADRIAN J. ZIOLKOWSKI
ROBERT W. ASTHEIMER
GERALD FALBEL
RICHARD F. LEFTWICH
BY
ATTORNEY

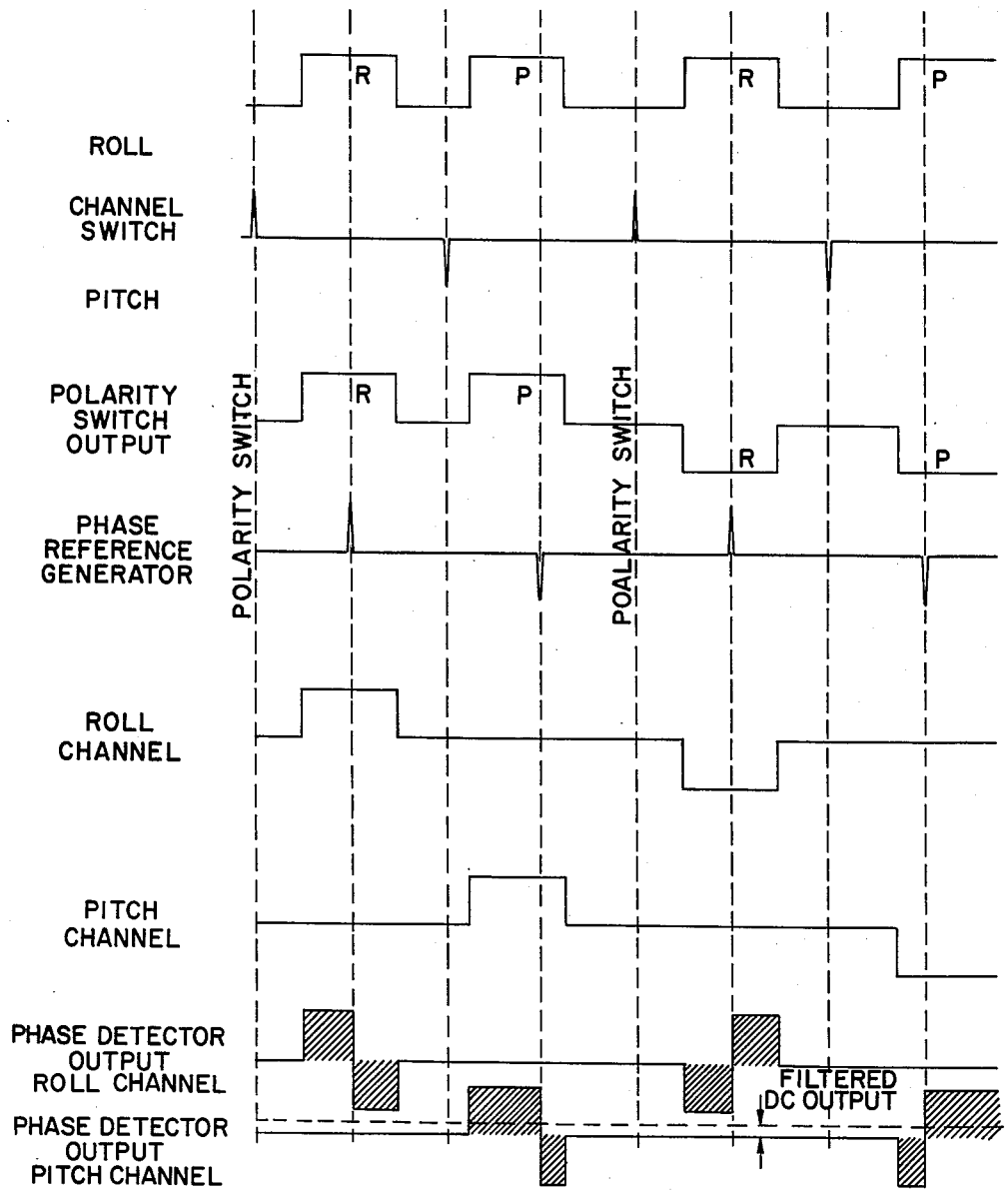

ns
Patented Apr. 2, 1963

3,083,611
MULTI-LOBAR SCAN HORIZON SENSOR
Adrian J. Ziolkowski and Gerald Falbel, Stamford, and Robert W. Astheimer, Westport, Conn., and Richard F. Leftwich, Pound Ridge, N.Y., assignors, by mesne assignments, to the United States of America as represented by the Administrator of the National Aeronautics and Space Administration
Filed Jan. 30, 1961, Ser. No. 85,585
10 Claims. (Cl. 88—1)

This invention relates to an improved horizon sensor.

The problem of horizon sensors which are essential to proper stabilization of nonspinning satellites and space probes is one which involves a number of stringent requirements, notably low power, minimum weight, minimum moving parts and maximum reliability and versatility. This last requirement is of particular interest in horizon sensors which are to give altitude information for space probes which have to operate over tremendous altitude changes, for example, from 100,000 miles to less than 5,000 miles and with planets of different diameter.

In general, horizon sensors operate in the infrared, although the operation of the instruments is not theoretically limited to this form of radiation. However, if reflected light is to be used in the visible or even in the ultraviolet, this limits utility on satellites, and to a lesser but still significant extent, on space probes. Therefore, while the instruments or instrument systems of the present invention are not limited in their broadest aspects to use with infrared radiations in a more specific aspect, infrared instruments are covered and they form by far the most important practical field of utility at the present time. Accordingly, the present invention will be discussed in terms of infrared instruments although it will be apparent that the nature of the radiation is not an essential limitation.

The standard horizon sensors in use today are used in pairs utilizing conical scans, each of the two horizon sensors being oriented along two axes. These instruments have achieved great practical success and operate reliably. The horizon sensors, however, have certain limitations. The duplication adds weight, power consumption and, of course, multiplication of moving parts has an effect on statistical life expectancy.

Other horizon sensors have been developed with oscillating scans across the horizon. Normally, three scanning systems are employed and although a single instrument assembly is possible the number of parts and weight is not significantly reduced. However, this type of horizon sensor lends itself to use for a wider range of altitudes, and can easily be utilized with simple circuit modifications to give altitude information as well as information as to satellite attitude.

The present invention retains the advantages of oscillatory scanning horizon sensors, as has been referred to above, and is useful over enormous ranges of altitude and has the important advantage of requiring only a single scanning means and simplified electronic circuits so that all information can be derived readily and accurately from a single scan. In effect the present invention performs at least as well as the others with approximately half as many parts. Also, in a more specific aspect of the invention, acquisition means are provided. This is of great importance, especially in space probes, because at a long distance the disc of a planet may be very small and it is easy for a sensor to lose it. Also in the case of some planets, particularly an inner planet such as Venus, the proximity of the Sun to the planet may also present a serious problem. Acquisition means and protection against Sun are obtained in the horizon sensors of the present invention by the addition of one additional drive means which is simple and rugged and which operates such a minute fraction of the total time that its contributions to shortening of useful, unattended life is entirely negligible.

The scan of the horizon sensor of the present invention utilizes a broad principle which is also utilized in the conical scan of the standard multiple horizon sensor systems of the present day, that is to say, a prism rotated. However, in the present invention, instead of rotating one prism, two prisms are rotated in opposite directions at a predetermined speed ratio. The result of counter-rotating two prisms is to produce scans which may be in the form of rosettes, their shapes being reminiscent of Lissajous-type figures obtained on oscilloscopes.

The number of lobes in the rosette of the scan may vary from three up, it being noted that there are certain rosettes such as certain multiples of three, for example six lobe rosettes, which cannot be generated in a continuous scan. The particular type of scan chosen, that is to say, the relation in the counter-rotational speeds of the two prisms, depends on a compromise with a number of factors. If there are a large number of lobes in the rosette, either the speed of scan, or the overall time constant of the instrument are affected. Too fast a scan will result in so rapid a passage across the horizon that the pulses are not reliable, as many infrared detectors have moderately long time constants, for example, of the order of a millisecond. With such detectors horizon crossings of significantly less than a millisecond are undesirable. As a result, when there are a large number of lobes in the scan, this introduces an undesirably long time constant to the whole instrument. There have been developed thermistors composed of very thin layers of germanium or silicon which have much shorter time constants down to as low as about 1 $\mu$ sec. When these extremely fast detectors are used it is, of course, possible to operate with much faster scans. These fast detectors, while they can be used in the present invention form no part thereof.

Rosettes with an uneven number of lobes give less stable signals, and in the case of scans with relatively small numbers of lobes, are undesirable although they can be used where precision is not so important. However, with a scan having a very large number of lobes, for example, of the order of 20 or more, the difference introduced by an uneven number of lobes becomes much smaller, and in such cases practical instruments can be designed with an uneven number of lobes in the scan. However, there is no advantage in using an uneven number and in general, therefore, even lobe scans are preferred.

Another factor is introduced by reason of the location of the lobes in different quadrants. Unless a number is a power of 2 from four lobes up there will not be an equal number of lobes in each quadrant of a full 360° scan. This is not necessarily fatal because the only effect is that there is a different sensitivity in the response to pitch and roll axis errors in vehicle orientation. In some unusual instances it may even be desirable to have different sensitivity for pitch and for roll. For general use, however, the scans which have a number of lobes which is a power of 2 above the first power are preferable.

Among the scans, the most perfect signal, a practically pure D.C., can be produced from a four lobe scan. This is preferred, therefore, for in most instruments with other numbers of lobes the final output signal will have a ripple. This is quite serious with scans of a small number of lobes but not very serious when there are a large number of lobes as the ripple frequency is then high and the amplitude small.

From the above it would appear that the four lobe scan has all the advantages and none of the disadvantages. This is not strictly true because the four lobe scan has lobes which are relatively large in width. This is a disadvantage for two reasons. The first reason, which is less important, is that with a wide lobe encountering the disc of a planet or other body at its extreme sweep the scan is crossing the edge of the disc at a very flat angle. This reduces precision somewhat and accentuates departures from the perfect circle of a disc, for example, by protuberances, mountains, or depressions. For many operations this disadvantage is so minor as to be of a second order significance. However, there is another disadvantage of the four lobe scan which may be slightly serious in certain cases. When the sensor is used in connection with a body at a great distance, for example, when it is 100,000 miles or more distant from a planet, which can occur in space probes, the subtended disc of the planet may be smaller than the width of the lobes at their widest part and in such a case the disc may be lost and not scanned. This requires an additional element which provides for acquisition and which rotates the whole prism assembly through a small arc until a small disc is cut by the scan path. While there is addition of a further mechanism the acquisition device operates only rarely, perhaps a minute or less per week or month, and so presents no problem of additional power consumption or wear. It does, however, add a little weight and an additional mechanism which theoretically can get out of order. When a large number of lobes are used in the scan, for example, a scan with 16 lobes, the width of the lobes is so small that the disc of the body observed cannot be lost and, therefore, in such cases an acquisition mechanism is completely unnecessary. In the case of some space probes this may be a sufficient advantage to warrant choosing a scan with a large number of lobes in spite of its other disadvantages. However, for the vast majority of instruments the advantage of the four lobe scan, with or without acquisition mechanism, is so great that it is preferred. In the following description the preferred four lobe scan will be described. Pulse generating elements which effect the switching will be described in conjunction with the four lobe scan and at the end of the specification it will be pointed out how their number has to vary with other scan patterns. This is more understandable after a consideration of the operation of the device as a whole including its electronic circuits.

As the scan proceeds from the local vertical the first lobe intersects the horizon at two points. The second lobe in a four lobe rosette then intersects the horizon also at two points but the axis of the lobe is at right angles. The third lobe is then parallel to the first lobe but opposite thereto and the fourth one has a similar relation to the second.

As each lobe scan progresses, a square wave is produced with a sharp discontinuity or pulse when the horizon is crossed. The rosette form of scan, however, does not by itself produce any useful information. It is necessary that the scan signal be related to the position of the roll and pitch axes on the satellite. This is done by providing four pulses in 90° intervals in the scan cycle. The pulses, however, are not sufficient because the directions of scan around opposite lobes of the rosette are the reverse of each other. In other words, if the first horizon crossing of the first lobe is in one direction the corresponding first crossing of the horizon of the third lobe will be in the opposite direction. This would result in pairs of square waves from each lobe of reversed polarity and they will cancel each other regardless of the relative widths of the square wave in each rosette scan. But it is precisely the relative widths of the square waves which determine whether the vehicle is tipped with respect to either pitch or roll axis. Therefore, the horizon sensor of the present invention requires additional elements than those needed in horizon sensors used up to the present time. Essentially what is required is an additional function of every other one of the four reference pulses. In addition to their ordinary function of separating information with respect to roll and pitch every other one must also reverse polarities of output so that the final outputs give intelligent signals with respect to roll and pitch. This involves a dual function of the pulses but not at every pulse, only every other one, which must actuate two, not one, electronic circuits. The new means is something that has hitherto not been needed in horizon sensors and it is this new means which permits information from a single scan whereas other horizon sensors have required multiple scanning heads. It is an advantage of the present invention that the new result is obtained with simple electronic circuits which involve no additional moving part or any elements that are not completely reliable.

It is another advantage of the present invention that without additional moving parts, detectors, or anything else except two additional simple electronic circuits, altitude information can be obtained which is always accurate and which is unaffected by temporary departures of the satellite from perfect stabilization on pitch and roll axes. The altitude information is given only when the satellite is in perfectly stabilized position. Again this is obtained by using the simplest kind of electronic circuits involving no components which are unreliable and necessitating a negligible additional power consumption.

In its broadest aspects the present invention with a single scanning mechanism, a single detector and simple and reliable electronics gives full information when it sees any horizon at all. For satellite operation this is ordinarily all that is needed. Yet for space probes, especially at great distances, and when as with a planet such as Venus or Mercury, close proximity of the Sun may be a problem, the sensor may lose the horizon, or it may be blinded by the Sun, thus giving spurious indications. A more specific modification of the invention provides for the acquisition of a lost horizon or moving away from an interfering Sun by rotating the whole scan pattern until a satisfactory position is reached. This needs only a simple drive motor which operates only for a few seconds in a day or week, presents no lubrication problem, and can transmit its information by simple, light, rugged means such as potentiometers so that regardless of the final angular position of the pattern the sensor gives roll, pitch and altitude information with the same accuracy as originally. This does, however, require a nonlinear coordinate transformation but this is effected or rather can be effected with elements of great simplicity, accuracy and reliability. In a more specific aspect, therefore, the invention includes means for acquiring lost horizons or avoiding an interfering Sun. The additional weight is negligible and because the acquisition drive is used so seldom and for such a short time no measurable additional power consumption results. Therefore, even for satellite use where a simplified instrument without acquisition facilities will work, means for rotating scan pattern will normally be worthwhile.

The invention will be described in connection with a specific instrument operating in the infrared and using typical simple mechanisms with standard electronic circuits. The invention, however, is not limited to any specific and exact mechanical or electronic design, it being one of its advantages that no critical unique designs are necessary. The invention will also be described in conjunction with the drawings in which:

FIG. 4 is an illustration of a series of output signal forms and control pulses.

Figure 1:
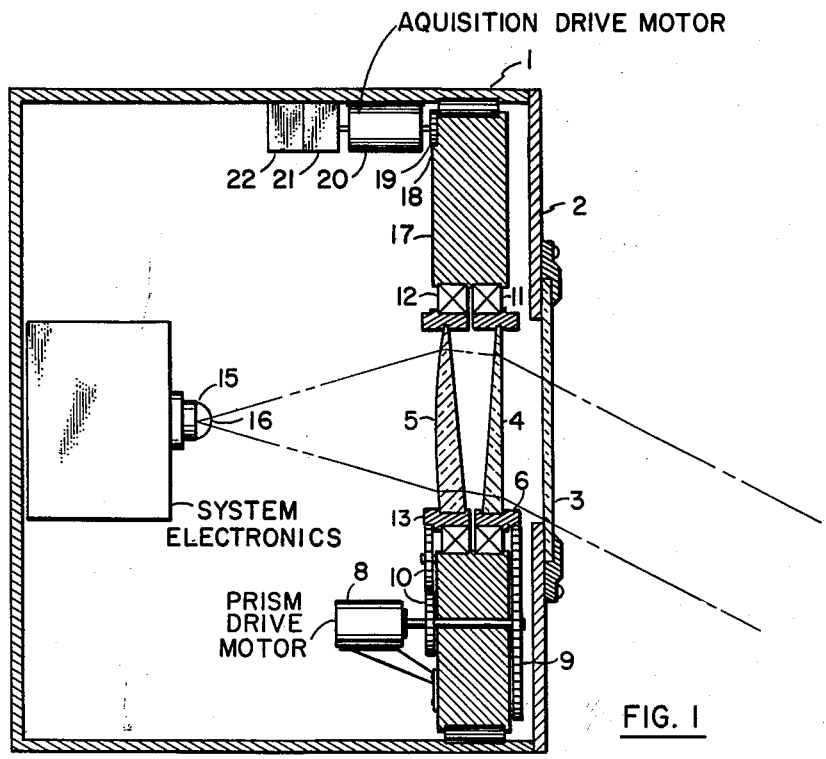
FIG. 1 is a section of the scanning mechanism.
Figure 3:
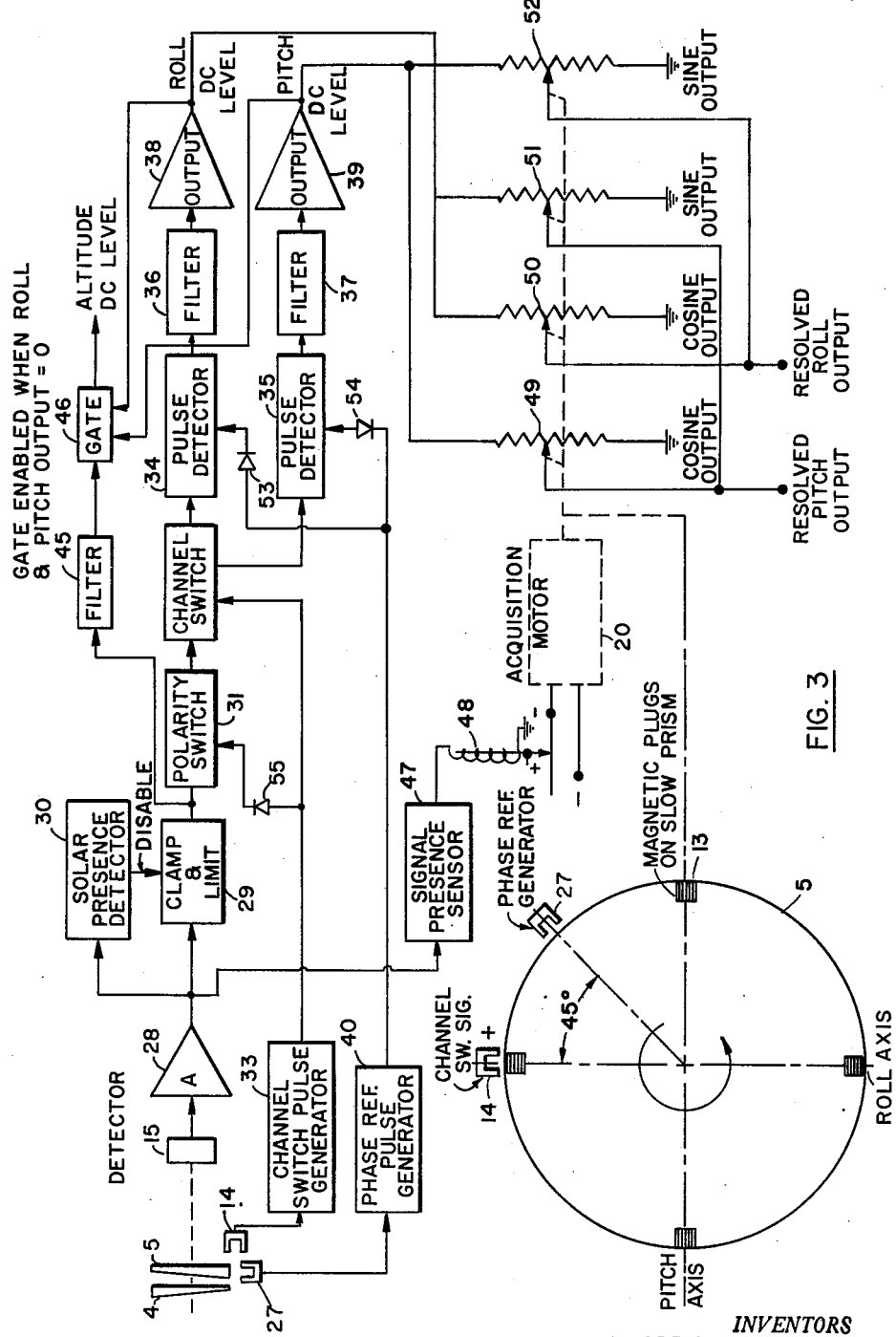
FIG. 3 is a diagram of the electronic circuits, for the most part in block or simplified schematic and with detectors and synchronous generators also shown diagrammatically.

FIG. 1 shows a housing 1 containing the scanning mechanism and electronic boards, the latter being shown blank as they are illustrated in FIG. 3. On the housing face there is a face plate 2 carrying a germanium window 3. Window and plate are shown as hermetically sealed to the housing to permit pressurization or other protection against environmental conditions. Back of the germanium window are two prisms 4 and 5 rotating in sleeves turning on ball bearings 11 and 12 in a movable framework 17. They are driven by a prism drive motor 8 through gears 9 and 10. The gears are chosen so that the prism 4 rotates at three times the rate of prism 5. The latter is also provided with a convex back face which acts as a lens imaging incoming collimated light on a detector 15 which is immersed in a germanium lens 16.

The sleeve of the slower rotating prism 5 is provided with four magnetic inserts 13, arranged as shown in FIG. 3, opposite inserts producing pulses of opposite polarity in magnetic pickup 14. An acquisition motor 20 drives a gear 19 which meshes with a gear 18 on the framework 17 thus rotating both prisms and hence the whole of the scan pattern itself. Connected to the shaft of the acquisition motor are two potentiometers 21 and 22 with sine and cosine output. At 45° to the pickup 14 there is a second pickup 27, which is also shown in FIG. 3, and which acts as a phase generator which will be described below.

Figure 2:
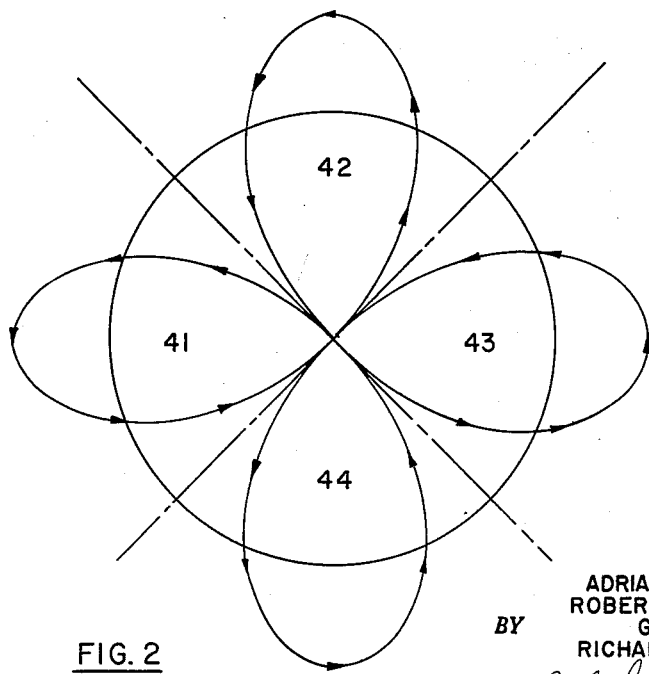
FIG. 2 is a diagram of the scan on two horizons representing extremes.

Turning to FIG. 2 it will be seen that the pattern consists of four lobes, 41, 42, 43 and 44. The design of the prisms is such that the extreme extent of the scan is 70°. This takes care of the horizon of a near planet, for example, in the case of Venus at 5,000 miles the subtense is 52°. At the same time there is sufficient scan to take care of a minimum subtense of 2.4° which would correspond to Mars at 100,000 miles. The scanning rate is such that the detector crosses the horizon in 1 millisecond, the prism 4 being rotated at 315 r.p.m. while prism 5 is rotated at 105 r.p.m. If the horizon is lost the acquisition motor 20 starts turning as a result of the absence of horizon pulses and rotates the whole of the pattern until a horizon is picked up. Ordinarily it is not necessary to rotate the pattern more than a few degrees, however, the acquisition motor can drive it through from 90 to 110°. If the drive is in a direction so that the horizon is not found the drive motor reverses itself by conventional switches (not shown), and searches back again through the same range.

It will be seen that there is only one main driving motor and the prisms in their sleeves are the only normally moving parts. When it is necessary to acquire a horizon, the acquisition motor operates only through a very short arc and for a time which may be a second or less. Accordingly, there is no significant wear on this part of the instrument and no measurable power consumption.

FIG. 3 shows the electronic circuits, for the most part in block diagram form, as they are of standard electronic design. The detector 15 feeds a signal into an A.C. preamplifier 28. This amplified signal then goes through a clamping and limiting amplifier 29. A portion of the signal passes through a circuit 30 which disables amplification if the Sun is seen as the signal from the Sun is far above any level of normal operation. A portion of this signal also actuates the signal presence sensing circuits 47 which keeps the acquisition motor 20 unconnected as long as there is any signal present. The solenoid 48 permits the switch to close in the absence of signal, or when the solar detector has disabled amplification.

In normal operation, the square waves produced by the detector now pass through a polarity switch 31 which is actuated by the pulses from magnetic pickup 14, suitably amplified in the channel switch pulse generator 33. The circuit 31 responds to pulses of only one polarity through the diode 55 and as a result responds only to every other pulse. From the polarity switch the signal goes into a channel switching circuit which is also actuated from the switch pulse generator 33. This circuit, however, responds to pulses of either polarity and its operation should be considered with respect to FIG. 2. Scanning starts in lobe 41. At the beginning of the scan the output will be switched into the roll channel and will go to pulse detector 34. After this scan is completed the switch will be to the pulse detector for pitch 35 then after the next lobe scan there will again be a switch to the roll and so on. The two pulse detectors 34 and 35 are alternately fed by positive and negative pulses respectively from a phase reference pulse generator 40 through diodes 53 and 54. This is actuated by the phase reference generator pickup 27. As this is at 45° to the roll and pitch axes it will produce a pulse which will determine the relative length of the square wave from one horizon passage to the other. If there is stabilization on either axis these two parts of the square wave will be equal.

The effect of the phase generator is shown on FIG. 4, and in its output the detector square wave for each lobe scan is divided into positive and negative as is shown in the last two lines of wave forms on FIG. 4. If there were no polarity switch the fact that the scan in opposite lobes is in opposite directions would cause one lobe pulse first to be positive and the other negative and similarly with the pitch pulses. This is shown in the third line on FIG. 4. Of course, this would effect cancellation regardless of the relative widths of the wave either side of the phase reference generator pulse. This result is shown in the fifth line and sixth line of FIG. 4. However, the polarity switch reverses so that all of the roll waves initially are positive and all of the pitch waves negative. The result appears in the last line of FIG. 4. It will be seen that difference in horizon passage will give a D.C. output. The lines show the satellite balanced on the roll axis but out of balance on the pitch axis.

The output from the pulse detectors 34 and 35 has considerable ripple and so is filtered in filters 36 and 37 to produce a filtered D.C. output. This is shown in dotted lines in the last line of FIG. 4. Finally output amplifiers 38 and 39 amplify the D.C. signals.

When the satellite is balanced on both axes, that is when the output of amplifiers 38 and 39 are zero, an altitude circuit is actuated. This opens the gate 46 and a portion of the signal from circuit 29 after filtering in the filter 45 is then fed out as a D.C. signal proportional to altitude. This is the average of both the roll and pitch pulses and depends only on the length of time between horizon crossings which again is related to altitude.

If the scan pattern is turned by the acquisition motor a nonlinear trigonometric transformation is needed so that the roll and pitch level outputs will be the same as if there had been no rotation. The motor rotates the movable arms on the four potentiometers 49, 50, 51, 52 shown in FIG. 3.

In the specific description of the invention with the preferred four lobe scan two kinds of switching have been provided, polarity switching and channel switching. The pulse generators have been actuated by the slow prism which was provided with pulse generating elements. Pulse generation is entirely conventional and the common magnetic type was therefore described in which magnetic inserts in the edge of the slow prism produced pulses. There are numerous other pulse generating elements, for example, holes through which light may shine and the like, but as these are all completely conventional only the common magnetic type has been specifically illustrated. The invention, of course, is not concerned with the particular design of pulse generating elements.

While the exact design of the pulse generating elements and their associated circuitry in pulse formation is a matter of indifference, the number of the elements and the switching circuits which are actuated by the pulses must correspond to the number of lobes in the scan. For the preferred scans in powers of two the number of pulse generating elements on the slow prism must equal the number of lobes. The polarity switching circuit is the same as described above, that is to say, it is actuated by every other pulse. This is true whether the scan has four lobes, eight lobes, sixteen lobes, etc. The channel switch which directs signals to the roll or pitch channel circuits respectively has to be actuated each time the scan pattern leaves the pair of quadrants in question. In the case of the four lobe scan with the roll and pitch axis located as shown, there is a change each scan for there is only one lobe per quadrant. Therefore, the channel switch circuit responds to each pulse. In the case of a larger number of lobes such as 8 or 16 there will be multiple scans with respect to the same axis in each quadrant, therefore, the switching circuit will not respond until the scans in the particular quadrant are finished. In the case of 8 lobes this will be every other scan and in the case of 16 lobes every four scans. The change in the circuit is electronically conventional introducing bistable or flip-flop circuits so that the final switch actuation does not occur until the required number of scans have been made.

The angular position of the pulse generator for the phase reference system will also change with the number of lobes. Here the relationship is quite simple. It is 180° divided by the number of lobes. In the case of 4 lobes this means that the two pulse generating circuits must be 45° from each other. In the case of 8 lobes this separation will be half as great.

We claim:
1. A horizon sensor comprising in combination and in optical alignment a detector for optical radiations which transforms the radiation into electrical signals, means for imaging a point on the object to be scanned onto the detector and scanning means comprising two counter-rotating prisms, the counter-rotation of the prisms being adjusted to produce a continuous scan in the form of a multilobar rosette, whereby scanning across a horizon produces an electrical signal depending on the radiation of the object or space scanned together with a sharp pulse when the scan crosses a horizon representing a sharp radiation discontinuity, means actuated by the counter-rotating prisms for changing polarity as the direction of scan changes, electronic amplifying circuits, one for orientation with respect to a pitch axis of the horizon sensor and one for a roll axis, pulse generating means actuated by the counter-rotating prisms for alternately switching the detector signal into pitch and roll channels, said switching means being actuated in synchronism with the change of scan pattern from one with respect to the pitch axis to one with respect to the roll axis and vice versa, and averaging means in the circuits to produce an electrical output proportional to the time of scan across an object the horizon of which is to be sensed.

2. A horizon sensor comprising in combination: an optical system consisting of a first prism and a second prism; drive means for rotating said prisms in opposite directions to provide a continuous scan in the form of a multi-lobar rosette pattern; a radiation detector positioned in optical alignment with said optical system, said optical system focusing radiation from the object scanned onto said detector for providing an electrical output signal having sharp pulses corresponding to the points at which the scan crosses the obejct horizon; first and second electronic circuits operatively connected to said detector for generating electrical output signals proportional to the angular deviation of the object horizon from first and second reference axes on said sensor; channel switching means for alternately directing said detector electrical output signal to one of said circuits; polarity switching means for reversing the polarity of selected pulses of said detector electrical output signal; each of said switching means being interposed between said detector and said electronic circuits and being actuated by said rotating prisms; and pulse generating means actuated by said rotating prisms for providing a phase reference pulse for said electronic circuits, said circuits being operatively connected to said pulse generating means.

3. A horizon sensor according to claim 2 wherein, the rotational speed of the counter-rotating prisms is such as to produce a scan pattern having $2^n$ lobes where $n$ is an integer greater than 1; the slower rotating prism is provided with uniformly spaced pulse generating elements the number of which is equal to the number of lobes in the scan; and two pulse generating systems actuated by the pulse generating elements for polarity and channel switching and phase reference respectively, said pulse generating systems being displaced around the periphery of the slowly rotating prism such that the angle between them equals $180°/2^n$.

4. A horizon sensor according to claim 3 in which the counter-rotating prisms turn at speeds in the ratio of 3 to 1 to produce a four lobe scan pattern.

5. A horizon sensor according to claim 2 wherein the counter-rotating prisms are mounted in a framework rotatable about the rotational axis of the prisms, means for rotating the framework slowly, switching means for starting and stopping rotation, and means responsive to said detector electrical output signal within a predetermined range for actuating the switching means to off position.

6. A horizon sensor according to claim 5 in which the counter-rotating prisms are driven at rates to produce a pattern having $2^n$ lobes where $n$ is an integer greater than 1.

7. A horizon sensor according to claim 6 in which the counter-rotating prisms turn at speeds in the ratio of 3 to 1 to produce a four lobe scan pattern.

8. A horizon sensor according to claim 5, wherein said first and second circuits are provided with non-linear variable transformation elements actuated by the angular movement of the framework and correcting for output change due to framework rotation.

9. A horizon sensor according to claim 8, wherein the elements are four potentiometers, two cosine and two sine, one sine and one cosine potentiometer being connected to the output of the first circuit and one cosine and one sine to the output of the second circuit, and means for adding the output of the cosine potentiometer of one circuit to that of the sine potentiometer of the other circuit.

10. A horizon sensor as defined in claim 2, and including altitude sensing means responsive to said circuit output signals and to said detector output signal for providing a further electrical output signal proportional to the length of time between horizon crossings.

References Cited in the file of this patent
UNITED STATES PATENTS

| | | |
|---|---|---|
| 2,950,428 | Givers | Aug. 23, 1960 |
| 2,975,289 | Robert et al. | Mar. 14, 1961 |
| 2,975,668 | Eckel | Mar. 21, 1961 |